United States Patent
Okamoto

(10) Patent No.: US 8,031,228 B2
(45) Date of Patent: Oct. 4, 2011

(54) ELECTRONIC CAMERA AND METHOD WHICH ADJUST THE SIZE OR POSITION OF A FEATURE SEARCH AREA OF AN IMAGING SURFACE IN RESPONSE TO PANNING OR TILTING OF THE IMAGING SURFACE

(75) Inventor: Masayoshi Okamoto, Daito (JP)

(73) Assignee: SANYO Electric Co., Ltd., Osaka (JP)

( * ) Notice: Subject to any disclaimer, the term of this patent is extended or adjusted under 35 U.S.C. 154(b) by 999 days.

(21) Appl. No.: 11/709,564

(22) Filed: Feb. 22, 2007

(65) Prior Publication Data
US 2007/0211161 A1 Sep. 13, 2007

(30) Foreign Application Priority Data

Feb. 22, 2006 (JP) .................................. 2006-044695
Feb. 14, 2007 (JP) .................................. 2007-033168

(51) Int. Cl.
*H04N 7/15* (2006.01)
*H04N 7/18* (2006.01)

(52) U.S. Cl. ...................... 348/169; 348/208.3; 348/170

(58) Field of Classification Search ............ 348/208.12, 348/208.14, 208.16
See application file for complete search history.

(56) References Cited

U.S. PATENT DOCUMENTS

| | | | | |
|---|---|---|---|---|
| 5,434,617 A | * | 7/1995 | Bianchi | 348/170 |
| 5,479,203 A | * | 12/1995 | Kawai et al. | 348/14.1 |
| 5,559,551 A | * | 9/1996 | Sakamoto et al. | 348/169 |
| 5,561,498 A | * | 10/1996 | Sekine et al. | 396/53 |
| 5,649,239 A | * | 7/1997 | Tamekuni | 396/104 |
| 7,248,286 B2 | * | 7/2007 | Cho | 348/208.14 |
| 7,423,669 B2 | * | 9/2008 | Oya et al. | 348/208.14 |
| 7,538,795 B2 | * | 5/2009 | Shibatani et al. | 348/208.16 |
| 2002/0135681 A1 | * | 9/2002 | Lo | 348/208.7 |
| 2002/0167594 A1 | * | 11/2002 | Sumi et al. | 348/208.14 |
| 2005/0128312 A1 | * | 6/2005 | Fredlund et al. | 348/222.1 |
| 2007/0115363 A1 | * | 5/2007 | Nakamura | 348/208.14 |

FOREIGN PATENT DOCUMENTS

| | | |
|---|---|---|
| JP | 09-127227 | 5/1997 |
| JP | 2004-320287 | 11/2004 |
| JP | 2005-215750 | 8/2005 |

* cited by examiner

*Primary Examiner* — David Ometz
*Assistant Examiner* — Dwight C Tejano
(74) *Attorney, Agent, or Firm* — Gerald T. Bodner

(57) ABSTRACT

An electronic camera includes an image sensor. The image sensor has an imaging surface for capturing an object scene, and repeatedly generates an object scene image. A CPU assigns a search area on the imaging surface, and repeatedly executes search processing for searching a facial image on the search area in parallel with executing object scene image generating processing of the image sensor. A character representative of a position of a facial image detected by the search processing is superposed on a through-image on an LCD monitor. The size of the search area assigned on the imaging surface is reduced as a panning and/or tilting speed of the imaging surface is increased.

18 Claims, 16 Drawing Sheets

(A) CENTRAL AREA SEARCH PROCESSING (B) PERIPHERAL AREA SEARCH PROCESSING

FIG. 2
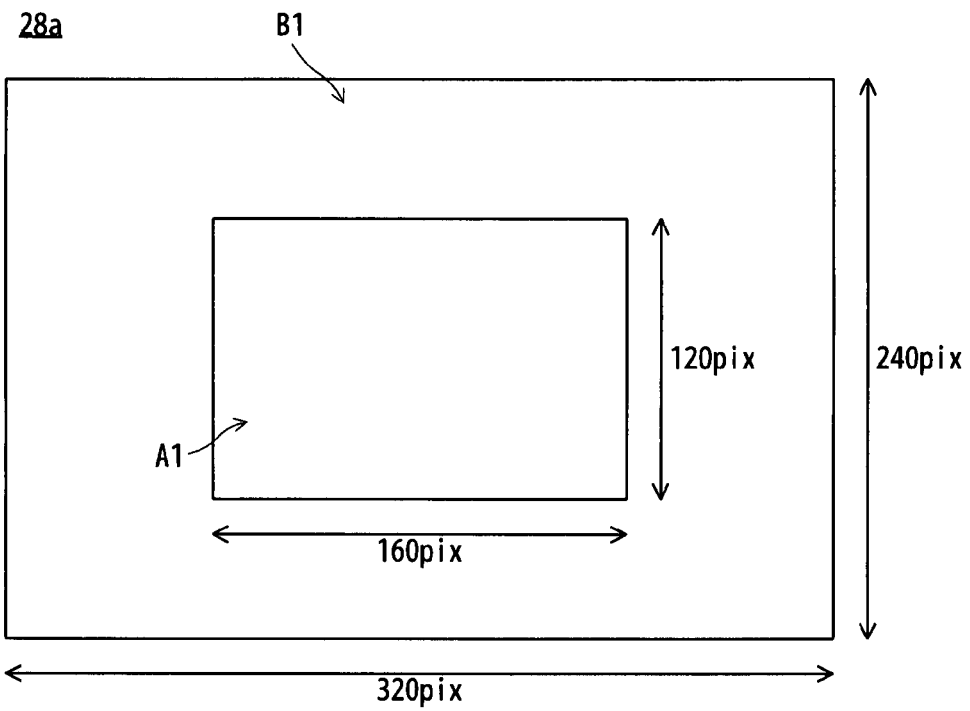
FIG. 3
(A) MAXIMUM SIZE 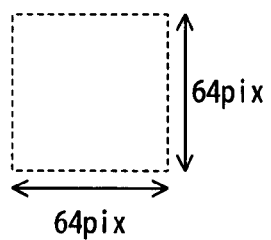
(B) MIDDLE SIZE 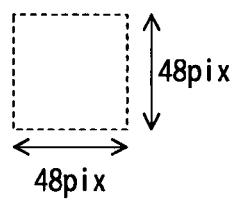
(C) MINIMUM SIZE 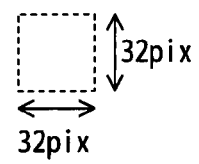

FIG. 4
(A) CENTRAL AREA SEARCH PROCESSING
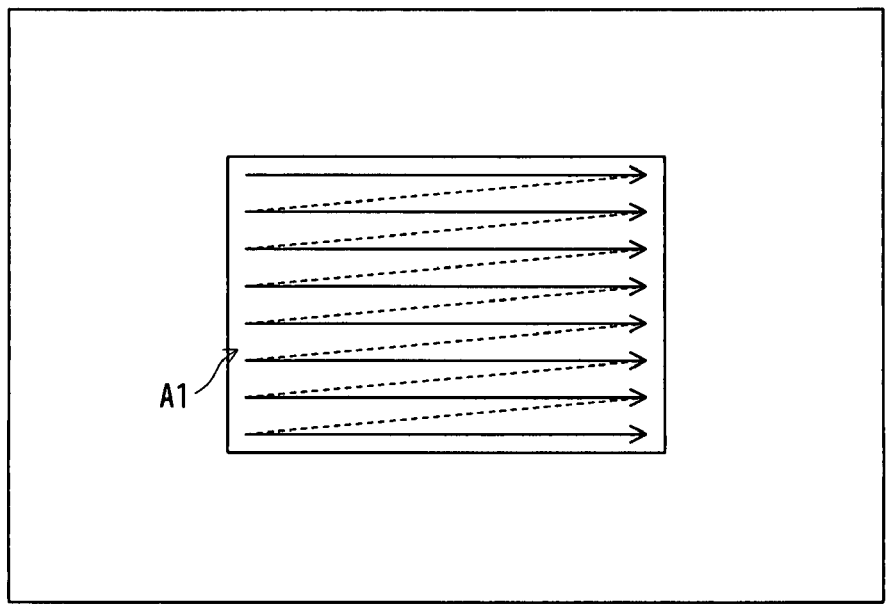
(B) PERIPHERAL AREA SEARCH PROCESSING
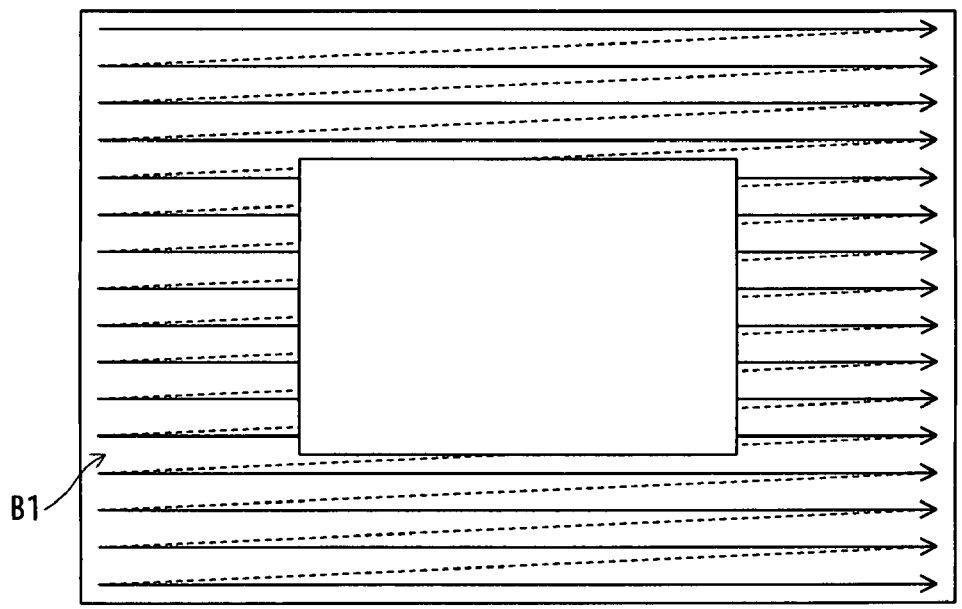

US 8,031,228 B2

ELECTRONIC CAMERA AND METHOD WHICH ADJUST THE SIZE OR POSITION OF A FEATURE SEARCH AREA OF AN IMAGING SURFACE IN RESPONSE TO PANNING OR TILTING OF THE IMAGING SURFACE

CROSS REFERENCE OF RELATED APPLICATION

The disclosure of Japanese Patent Application No. 2006-44695 and 2007-33168 are incorporated herein by reference.

BACKGROUND OF THE INVENTION

1. Field of the Invention

The present invention relates to an electronic camera. More specifically, the present invention relates to an electronic camera which adjusts an imaging condition by paying attention to a feature image appearing in an object scene image.

2. Description of the Related Art

One example of a camera of such a kind is disclosed in a patent document. According to the patent document, a face detecting area having a high possibility of existence of a face of a person is set on the basis of assist mode information. Face detecting processing is executed by noting the set area, and image correction processing such as a tone correction, a contrast correction, a color-balancing correction, an edge enhancement, etc. is executed on the basis of a face detection result. However, in the patent document, the size and/or the position of the face detecting area is fixed irrespective of panning and/or tilting the imaging surface. Thus, panning and/or tilting the imaging surface may prevent a face of a person from being detected accurately.

SUMMARY OF THE INVENTION

According to the preferred embodiment, an electronic camera comprises: an imaging means having an imaging surface to capture an object scene for repeatedly generating an object scene image; an assignment means for assigning a search area on the imaging surface; a search means for repeatedly executing search processing to search a feature image on the search area assigned by the assignment means in parallel with executing generation processing by the imaging means; an output means for outputting position information representative of a position of the feature image detected by the search means; and a change means for changing a size and/or a position of the search area assigned by the assignment means in correspondence with panning and/or tilting of the imaging surface.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing one example of a central area and a peripheral area assigned on a display image area of an SDRAM applied to FIG. 1 embodiment;

FIG. 3 (A) is an illustrative view showing one example of a maximum sized face determining area to be scanned on the display image area shown in FIG. 2;

FIG. 3 (B) is an illustrative view showing one example of a middle sized face determining area to be scanned on the display image area shown in FIG. 2;

FIG. 3 (C) is an illustrative view showing one example of a minimum sized face determining area to be scanned on the display image area shown in FIG. 2;

FIG. 4 (A) is an illustrative view showing a part of a search processing operation paying attention to a central area;

FIG. 4 (B) is an illustrative view showing a part of the search processing operation paying attention to a peripheral area;

DETAILED DESCRIPTION OF THE PREFERRED EMBODIMENTS

Figure 1:
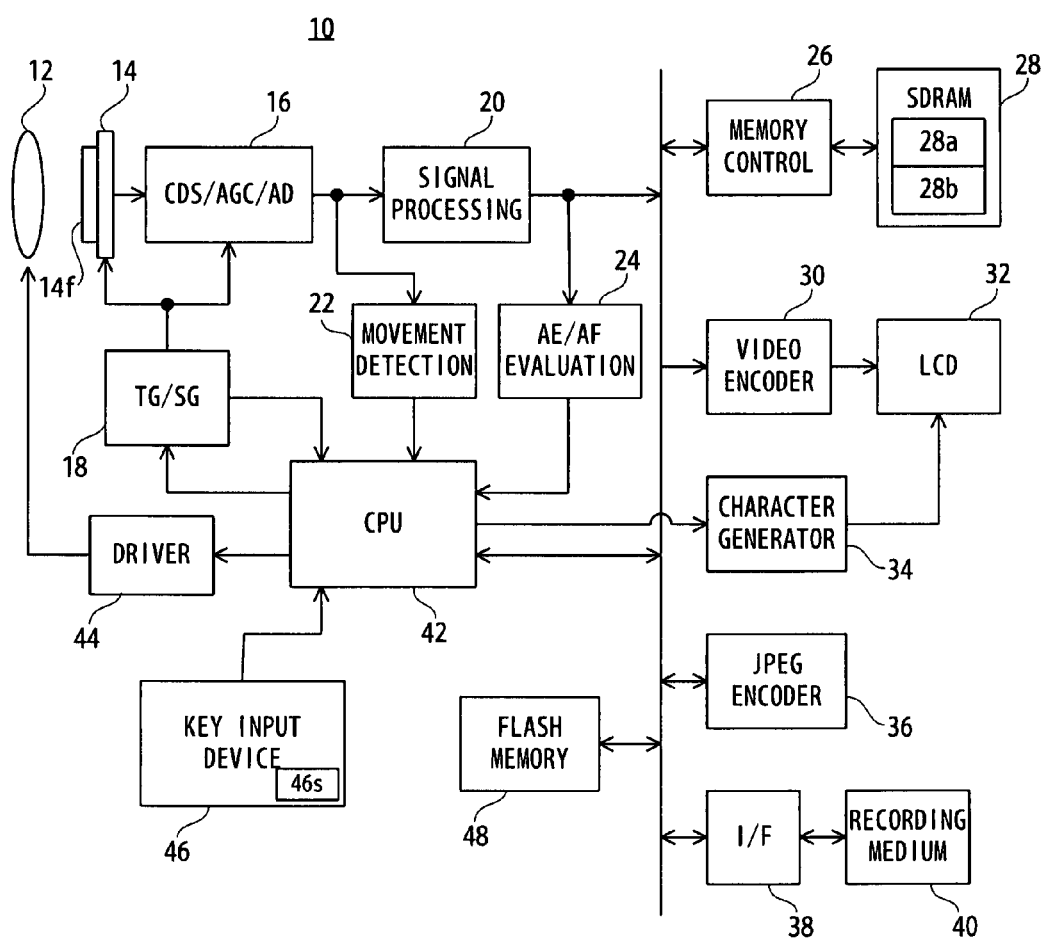
FIG. 1 is a block diagram showing one example of a configuration of the present invention.

Referring to FIG. 1, a digital camera 10 of this embodiment includes an optical lens 12. An optical image of an object scene is irradiated on an imaging surface 14*f* of an image sensor 14 through the optical lens 12 so as to be subjected to photoelectronic conversion. Thus, an electric charge representative of an object scene, that is, a raw image signal is generated.

When a power source is turned on, a CPU 42 instructs a TG/SG 18 to repeat a pre-exposure and a thinning-out reading in order to execute through image processing. The TG/SG 18 applies a plurality of timing signals to the image sensor 14 in order to execute a pre-exposure of the imaging surface 14*f* of the image sensor 14 and thinning-out reading of the electric charges thus obtained. The raw image signal generated by the imaging surface 14*f* is read in an order according to a raster scanning in response to a vertical synchronization signal Vsync output per 1/30 seconds.

The raw image signal output from the image sensor 14 is subjected to a series of processes such as a correlative double sampling, an automatic gain adjustment, and an A/D conversion by a CDS/AGC/AD circuit 16. A signal processing circuit 20 performs processes, such as a white balance adjustment, a color separation, a YUV conversion, etc. on the raw image data output from the CDS/AGC/AD circuit 16 to write image data in a YUV format to a display image area 28a of an SDRAM 28 through a memory control circuit 26.

A video encoder 30 reads the image data stored in the display image area 28a through the memory control circuit 26 per 1/30 seconds, and converts the read image data into a composite video signal. Consequently, a real-time motion image (through-image) showing an object scene is displayed on an LCD monitor 32.

A movement detection circuit 22 takes in raw image data utilized for movement detecting processing per 1/30 seconds out of the raw image data output from the CDS/AGC/AD circuit 16, and detects a movement vector representative of changes of the object scene due to a panning and/or tilting operation on the basis of the taken raw image data. The detected movement vector is applied to the CPU 42.

An AE/AF evaluation circuit 24 creates a luminance evaluation value representative of brightness of the object scene and a focus evaluation value representative of a focus level of the object scene on the basis of the image data output from the signal processing circuit 20. The created luminance evaluation value and focus evaluation value are applied to the CPU 42.

When a shutter button 46s provided on a key input device 46 is not operated, the CPU 42 executes AE processing for a through image. A pre-exposure time set to the TG/SG 18 is controlled on the basis of the luminance evaluation value from the AE/AF evaluation circuit 24. Thus, brightness of the through-image is adjusted moderately.

The CPU 42 further determines whether or not the panning and/or tilting operation of the imaging surface 14f is in a suspended state on the basis of the movement vector from the movement detection circuit 22. If a movement vector amount is below a threshold value TH, the CPU 42 considers that the panning/tilting operation is in a suspended state, and executes facial image search processing described below on the basis of the object scene image taken by the imaging surface 14f.

Referring to FIG. 2, on the display image area 28a, a central area A1 and a peripheral area B1 are assigned. The central area A1 is smaller than the display image area 28a, and allocated at the center of the display image area 28a. The peripheral area B1 is allocated at the periphery of the display image area 28a so as to surround the central area A1.

First, the central area A1 is set as a search area, a maximum sized face determining area shown in FIG. 3 (A) is arranged at the upper left of the central area A1. The coordinates at the upper left of the face determining area are coincident with the coordinates at the upper left of the central area A1.

A feature quantity of a partial image belonging to the face determining area is verified with a feature quantity of a dictionary stored in the flash memory 48. As a result of the verification processing, if a notable partial image is determined to be a facial image, facial information describing the current size and position of the face determining area is created. The face determining area is moved by a defined value (=one pixel) in a raster direction unless the notable partial image is determined to be a facial image. The face determining area moves on the central area A1 in a manner shown in FIG. 4 (A).

When the face determining area arrives at the lower right of the central area A1, that is, the coordinates at the lower right of the face determining area are coincident with the coordinates at the lower right of the central area A1, a middle sized face determining area shown in FIG. 3 (B) is arranged at the upper left of the central area A1 in place of the face determining area shown in FIG. 3 (A), and the processing described above is executed again. When the middle sized face determining area arrives at the lower right of the central area A1, a minimum sized face determining area shown in FIG. 3 (C) is arranged at the upper left of the central area A1, and the processing described above is repeated.

When the minimum sized face determining area arrives at the lower right of the central area A1 without the facial image being detected, the search area is enlarged to the entire display image area 28a, and the central area A1 is excluded from the search area. That is, the peripheral area B1 is taken as a search area. A feature quantity verification processing and a face determining area movement processing are executed according to the above-described manner by means of the three face determining areas having different sizes. The face determining area moves on the display image area 28a as shown in FIG. 4(B). Additionally, since the central area A1 is an excluded area, a period during which the face determining area is completely overlapped with the central area A1, that is, the entire face determining area is overlapped with a part of the central area A1, the feature quantity verification processing is omitted.

Thus, the feature quantity verification processing and the face determining area movement processing are first performed on the central area A1 at three times, and they are executed on all over the area except for the central area A1 at three times. When a facial image is found during the processing, facial information describing the size and position of the face determining area at that time is created. The created facial information points out the facial image first found. When the minimum sized face determining area arrives at the lower right of the peripheral area B1 without the facial image being found, facial information representative of an initial value is created.

Figure 5:
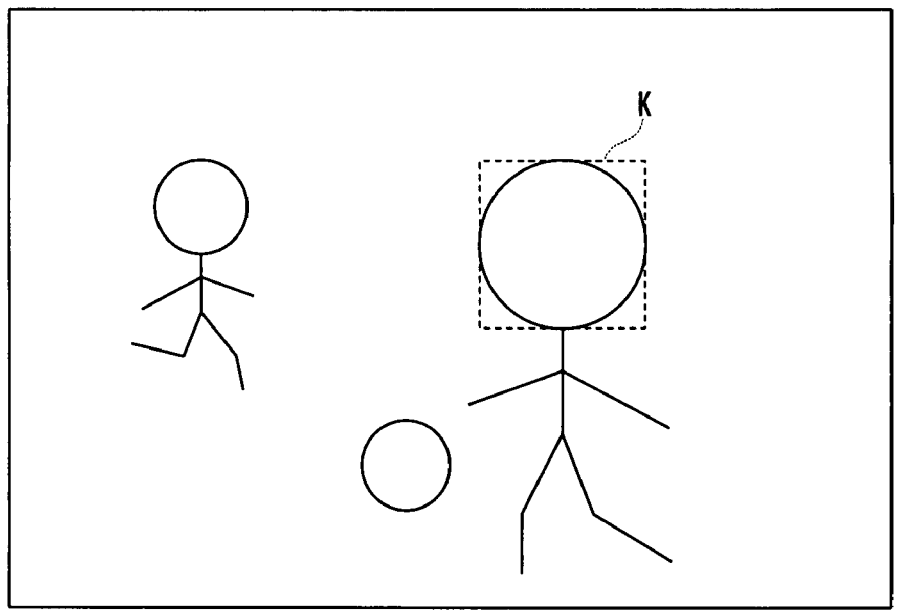
FIG. 5 is an illustrative view showing one example of an image displayed on an LCD monitor to be applied to FIG. 1 embodiment.
Figure 6:
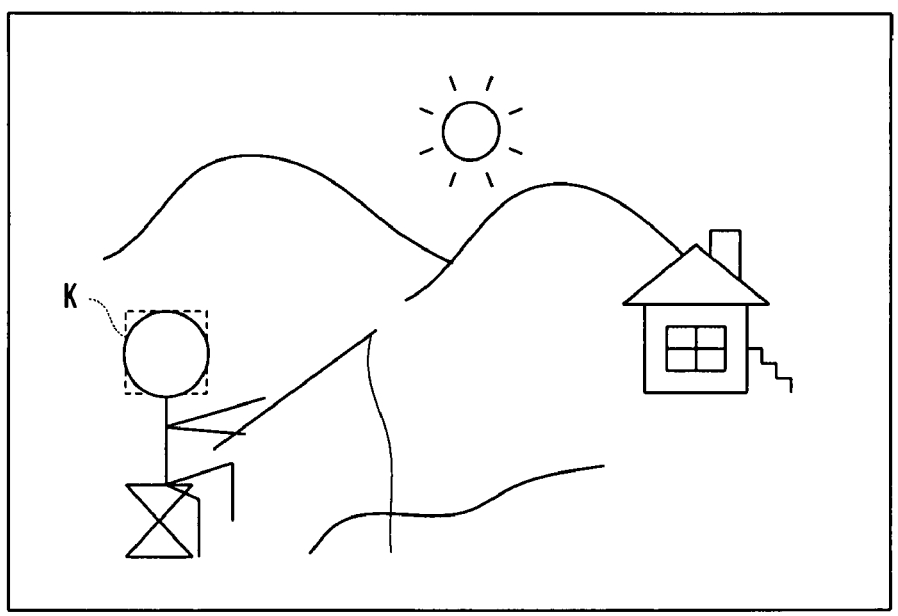
FIG. 6 is an illustrative view showing another example of an image to be displayed on the LCD monitor to be applied to FIG. 1 embodiment.

When the facial information shows a numerical value different from the initial value, the CPU 42 instructs a character generator 34 to OSD-display a character K defined by the facial information. The character generator 34 applies character data to the LCD monitor 32 in order to display the character K having the size described in the facial information at a position described in the facial information. The character K is superposed on the through-image in a manner shown in FIG. 5 or FIG. 6, for example.

When the shutter button 46s is half-pushed, the CPU 42 executes AF processing and AE processing in a different manner depending on the numerical value indicated by the facial information. When the facial information indicates an initial value, the CPU 42 executes AF processing and AE processing taking the central area A1 as a reference. On the contrary thereto, when the facial information indicates a numerical value different from the initial value, the CPU 42 executes AF processing and AE processing taking the facial image area defined by the facial information as a reference. As a result of the AF processing, the optical lens 12 is set to a focal point by the driver 44. Furthermore, as a result of the AE processing, the exposure time set to the TG/SG 18 is set to an optimum value.

When the shutter button 46s is full-pushed, the CPU 42 instructs the TG/SG 18 to perform a primary exposure and all pixel reading, and instructs the JPEG encoder 36 to perform a JPEG compression in order to execute recording process.

The TG/SG 18 applies a plurality of timing signals to the image sensor 14 in order to execute a primary exposure of the imaging surface 14f of the image sensor 14 and reading of all the electric charges thus obtained. A raw image signal generated on the imaging surface 14f is read in an order according to a raster scanning. The raw image signal output from the image sensor 14 is converted into image data in YIN format by the above-described processing. The converted image data is written to a recording image area 28b of the SDRAM 28 through the memory control circuit 26.

A JPEG encoder 36 reads the image data stored in the recording image area 28b through the memory control circuit 26, compresses the read image data in a JPEG system, and writes the compressed image data, that is, the JPEG data to the recording image area 28b through the memory control circuit 26. The JPEG data thus obtained is then read by the CPU 42, and recorded in the recording medium 40 in a file format through an I/F 38.

Figure 7:
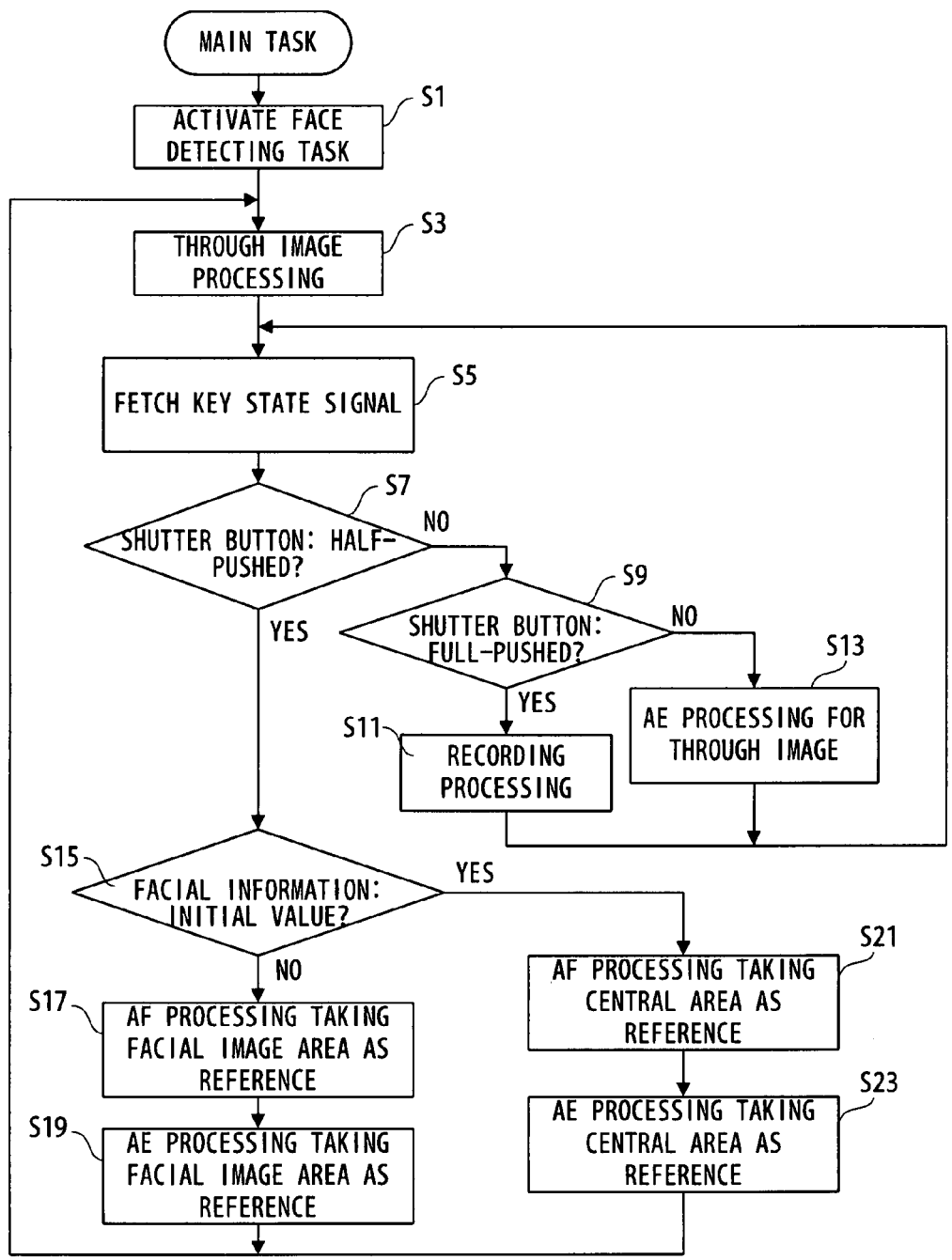
FIG. 7 is a flowchart showing a part of an operation of a CPU applied to FIG. 1 embodiment.
Figure 8:
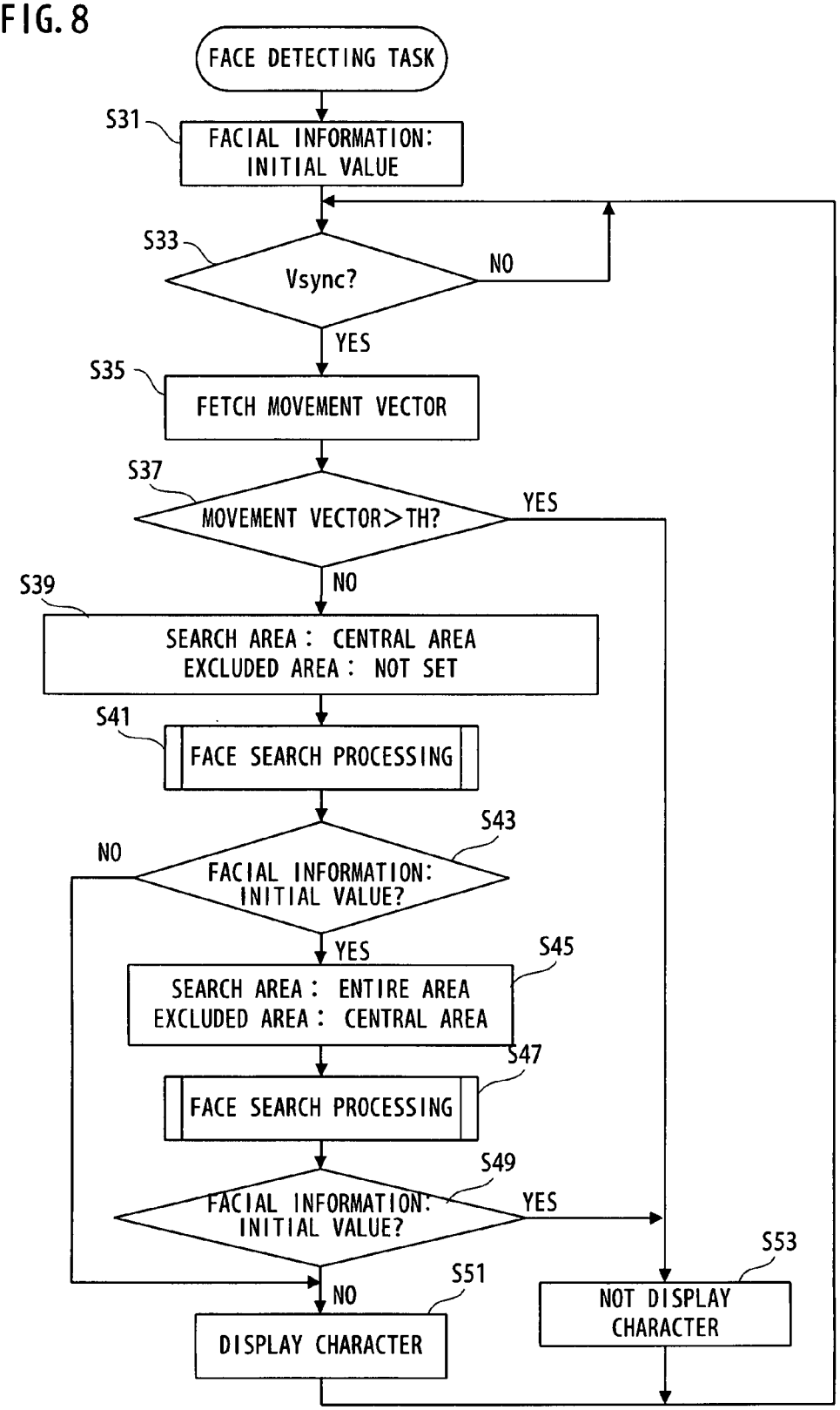
FIG. 8 is a flowchart showing another part of the operation of the CPU applied to FIG. 1 embodiment.
Figure 9:
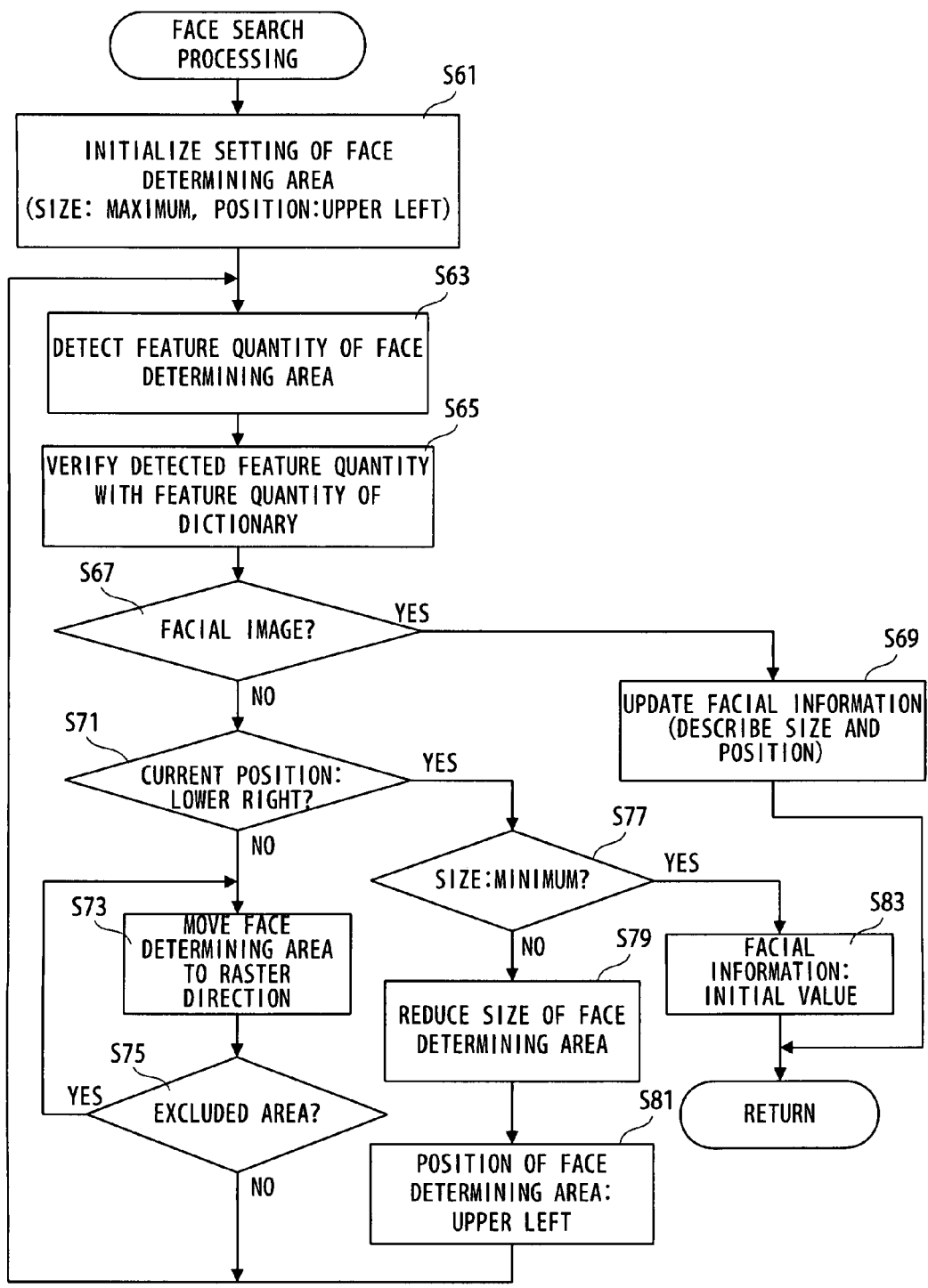
FIG. 9 is a flowchart showing the other part of the operation of the CPU applied to FIG. 1 embodiment.

The CPU 42 executes a plurality of tasks including a main task shown in FIG. 7 and a face detecting task shown in FIG. 8-FIG. 9 in parallel. The control program corresponding to these tasks are stored in a flash memory 48.

First, with reference to FIG. 7, in a step S1, face detecting task is activated, and in a step S3, through image processing is executed. The face detecting task shown in FIG. 7-FIG. 8 is started by the processing in the step S1. Through-image is displayed on the LCD monitor 32 by the processing in the step S3.

In a step S5, a key state signal is fetched from the key input device 46. In a step S7, it is determined whether or not the shutter button 46s is half-pushed, and in a step S9, it is determined whether or not the shutter button 46s is full-pushed.

If "YES" in the step S7, the process returns to the step S3 through processing in steps S15-S23. If "YES" in the step S9, recording processing is executed in a step S11, and then, the process returns to the step S5. If "NO" in each of the steps S7 and S9, AE processing for a through image is executed in a step S13, and then, the process returns to the step S5.

By the processing in the step S11, JPEG data representative of the object scene image when the shutter button 46s is operated is recorded in the recording medium 40 in a file format. By the processing in the step S13, the brightness of the through-image is moderately adjusted.

In the step S15, it is determined whether or not facial information indicates an initial value. If the facial information is different from the initial value, AF processing and AE processing taking the facial image area defined by the facial information as a reference are executed in the steps S17 and S19, respectively. If the facial information indicates the initial value, AF processing and AE processing taking the central area A1 shown in FIG. 2 as a reference are executed in the steps S21 and step S23, respectively.

Referring to FIG. 8, in a step S31, the facial information is set to the initial value. When a vertical synchronization signal Vsync is generated, "YES" is determined in a step S33, and a movement vector is fetched from the movement detection circuit 22 in a step S35. In a step S37, it is determined whether or not the fetched movement vector amount is above a threshold value TH. If "YES", it is considered that the panning/tilting operation of the imaging surface 14f is being executed, and the process proceeds to a step S53. If "NO", it is considered that the panning/tilting operation of the imaging surface 14f is being suspended, and the process proceeds to a step S39.

In the step S39, the central area A1 shown in FIG. 2 is set as a search area, and the excluded area is not set. In a step S41, face search processing is executed, and in a step S43, it is determined whether or not the facial information indicates the initial value. If the facial information indicates a numerical value different from the initial value, it is considered that the facial image is found, and the process proceeds to a step S51. If the facial information indicates the initial value, it is considered that the facial image has not been found yet, and the process proceeds to a step S45.

In the step S45, the entire area of the display image area 28a shown in FIG. 2 is set as a search area, and the central area A1 is set as an excluded area. In a step S47, face search processing is executed, and in a step S49, it is determined whether or not the facial information indicates the initial value. If the facial information indicates a numerical value different from the initial value, the process proceeds to the step S51, and if the facial information indicates the initial value, the process proceeds to a step S53.

In the step S51, a corresponding instruction is applied to the character generator 34 in order to display a rectangular character K on the facial image area defined by the facial information. In the step S53, a corresponding instruction is applied to the character generator 34 in order to suspend the display of the character K. After completion of the processing in the step S51 or S53, the process returns to the step S33.

The face search processing in each of the steps S41 and S47 complies with a subroutine shown in FIG. 9. First, in a step S61, the setting of the face determining area is initialized. Thus, the maximum sized face determining area is arranged at the upper left of the search area. The face determining area is set on the display image area 28a shown in FIG. 2 such that the coordinates at the upper left of the face determining area are coincident with the coordinates at the upper left of the search area.

In a step S63, a feature quantity of the set face determining area is detected, and in a step S65, the detected feature quantity is compared with a feature quantity of a dictionary. In a step S67, it is determined whether or not a partial image belonging to the face determining area is a facial image on the basis of the verification result in the step S65.

If "YES" in the step S67, the facial information is updated in a step S69. In the facial information, the current size and position of the face determining area are described. After completion of the processing in the step S69, the process is restored to the hierarchical upper level of the routine.

If "NO" in the step S67, the process proceeds to a step S71 to determine whether or not the coordinates at the lower right of the face determining area are coincident with the coordinates at the lower right of the search area. Here, if "NO", the face determining area is moved by a defined value in a raster direction in a step S73. In a step S75, it is determined whether or not the moved face determining area is completely overlapped with the excluded area, and if YES, the process returns to the step S73 while if NO, the process returns to the step S63.

If "YES" in the step S71, it is determined whether or not the size of the face determining area is a "minimum" in a step S77. If the size of the face determining area is a "minimum", it is considered that search of the facial image from the search area is failed, and the facial information is set to the initial value in a step S83. Then, the process is restored to the hierarchical upper level of the routine. If the size of the face determining area is a "maximum" or a "middle", the size of the face determining area is reduced by one step in a step S79, and the face determining area is arranged at the upper left of the search area in a step S81, and then, the process returns to the step S63.

As understood from the above description, the image sensor 14 has the imaging surface 14f for capturing an object scene. The CPU 42 searches a facial image from the central area A1 of the object scene image captured by the imaging surface 14f (S39, S41), and searches a facial image (feature image) from the peripheral area B1 of the object scene image captured by the imaging surface 14f when failing in the search from the central area A1 (S45, S47). The CPU 42 notes the facial image first found from the central area A1 or the peripheral area B1 and adjusts an imaging condition such as a focus, an exposure time, etc.

When a facial image exists in the central area A1, the imaging condition is adjusted without waiting for the search from the peripheral area B1. Thus, it is possible to minimize a time required for adjustment of the imaging condition noting the facial image. If a facial image does not exist in the central area A1, a facial image is searched from the peripheral area B1. Thus, it is possible to enlarge a search range of the facial image.

It should be noted that in this embodiment, three face determining areas having different sizes are prepared, wherein as the number of face determining areas increases, that is, as the size of the face determining area is diversified, a search accuracy of the facial image is improved. Furthermore, in this embodiment, a facial image of a person is assumed as a feature image, but the feature image is not limited thereto.

Figure 10:
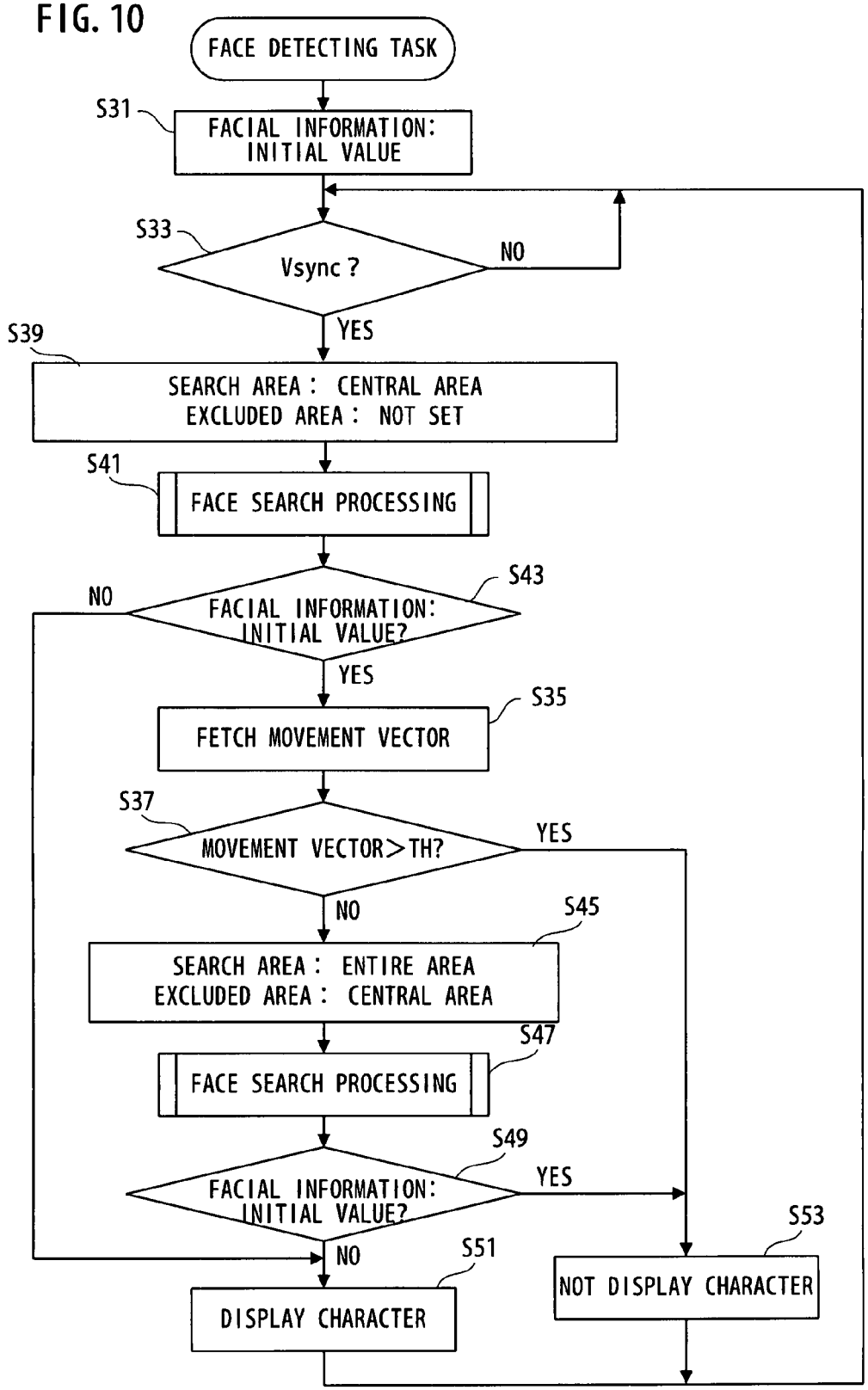
FIG. 10 is a flowchart showing a part of an operation of a CPU applied to another embodiment of the present invention.

In addition, in this embodiment, the face search processing noting each of the central area A1 and the peripheral area B1 is executed after the panning and/or tilting operation is suspended, but the face search processing noting the central area A1 may be executed during the panning and/or tilting operation. In this case, as shown in FIG. 10, the processing of the steps S39-S41 has to be moved between the steps S33 and S35. Consequently, when the panning and/or tilting operation is being executed, only the central area A1 is an object to be subjected to the face search processing. That is, the search area is reduced in an order of "A1+B1"→"A1" as the speed of the panning and/or tilting the imaging surface 14f is increased. It should be noted that the configuration except for the configuration shown in FIG. 10 is the same as that of the FIG. 1-FIG. 9 embodiment, and therefore, a duplicated explanation will be omitted.

According to this embodiment, the image sensor 14 has the imaging surface 14f capturing an object scene, and repeatedly generates an object scene image. The CPU 42 assigned a search area on the imaging surface 14f (S39, S45), and repeatedly executes search processing for searching a facial image (feature image) on the search area and object scene image generating processing on the image sensor 14 in parallel. A character K (position information) representative of the position of the facial image detected by the search processing is superposed on the through-image of the LCD monitor 32 (S51). The size of the search area assigned on the imaging surface 14f is changed by the CPU 42 in correspondence with the panning and/or tilting of the imaging surface 14f (S37). That is, the search area is reduced in an order of "A1+B1"→"A1"→zero as the speed of the panning and/or tilting the imaging surface 14f is increased.

Thus, the size of the search area is changed in correspondence with the panning and/or tilting the imaging surface 14f, and a facial image is searched from the image to which the changed search area belongs. Accordingly, even when the panning and/or tilting of the imaging surface are performed, it is possible to precisely detect the facial image. That is, the time required for the search processing is shortened as the size of the search area is small, and therefore, when a panning and/or tilting operation of the imaging surface 14f is performed following the movement of the facial image, it is possible to continue to detect the facial image accurately.

Furthermore, in the above-described embodiment, the size of the search area is set to "A1+B1", "A1" or zero in correspondence with a panning and/or tilting operation of the imaging surface 14f, but the number of the sizes of the search area to be prepared may be four or more. In this case, a central small area A2 (size: 80 by 107 vertical/horizontal pixels) shown in FIG. 11 is additionally provided at the center of the display image area 28a, and a face detecting task shown in FIG. 12-FIG. 13 has to be executed in place of the face detecting task shown in FIG. 8.

Figure 11:
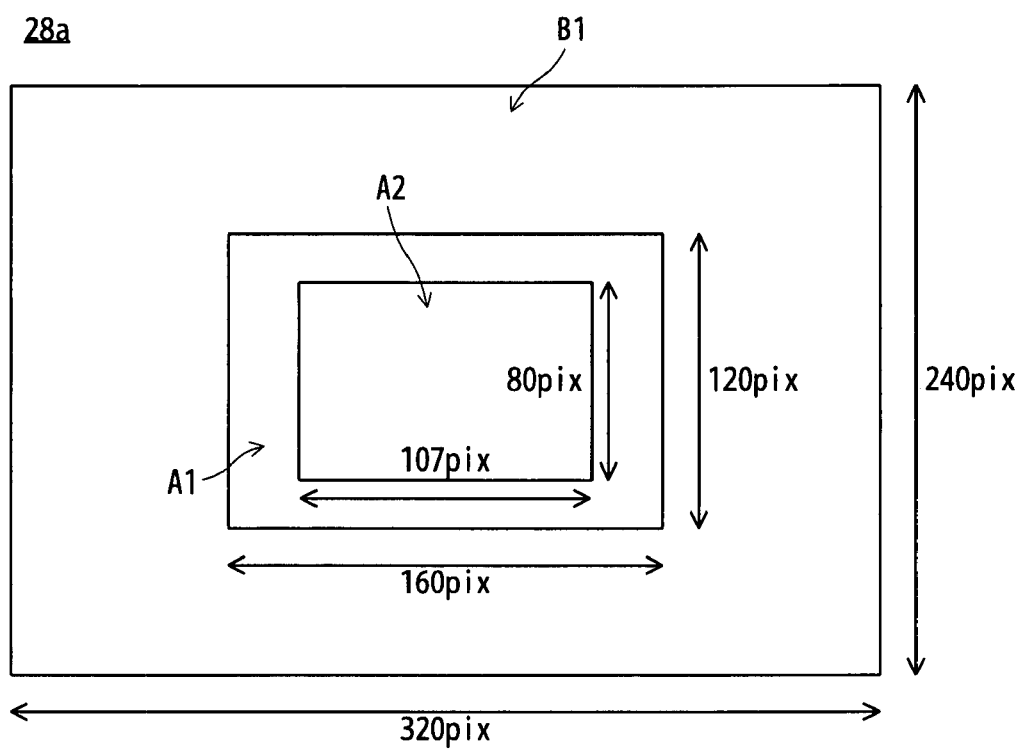
FIG. 11 is an illustrative view showing a part of an operation applied to the other embodiment of the present invention.
Figure 12:
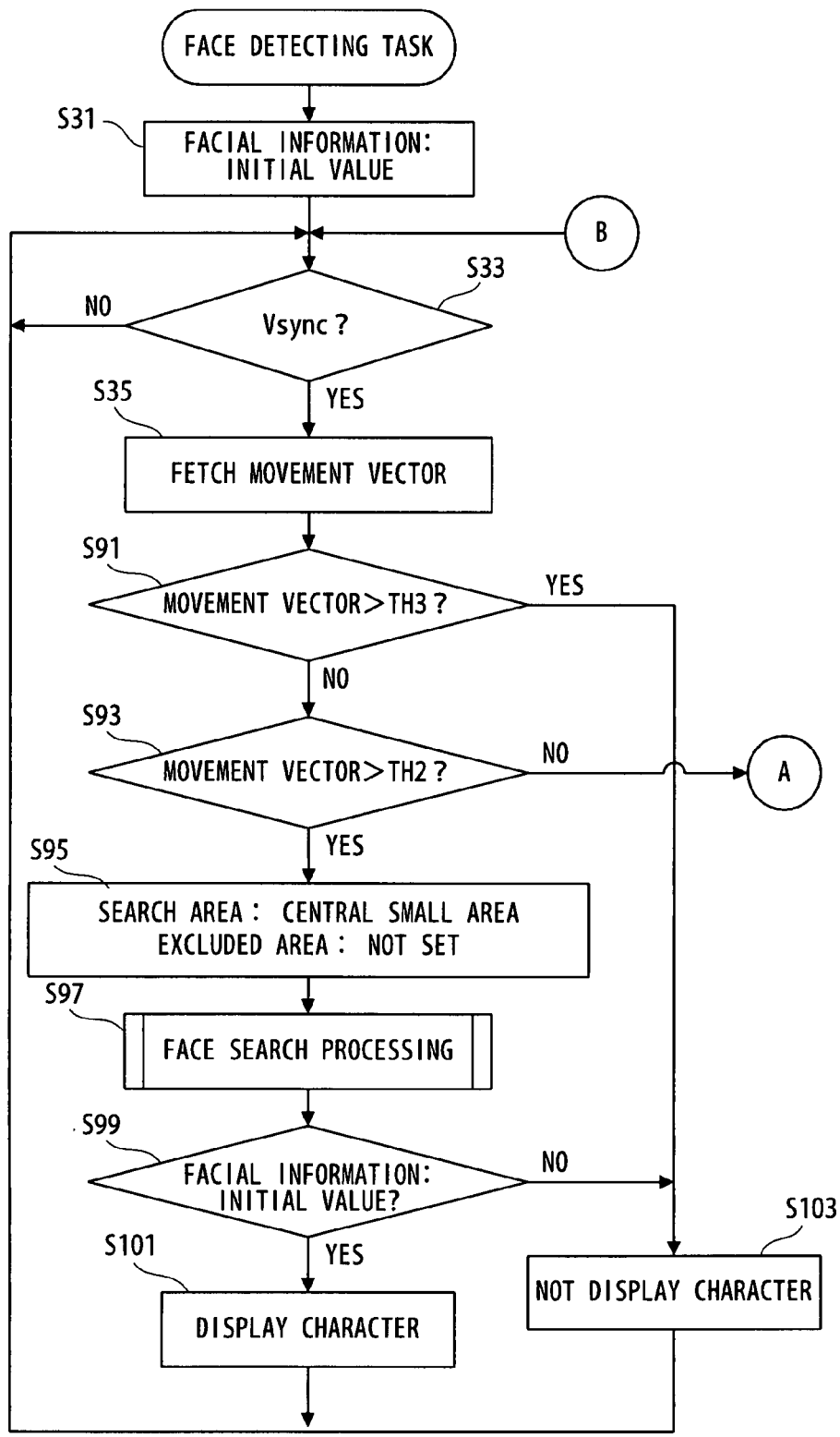
FIG. 12 is a flowchart showing a part of an operation of a CPU applied to FIG. 11 embodiment.
Figure 13:
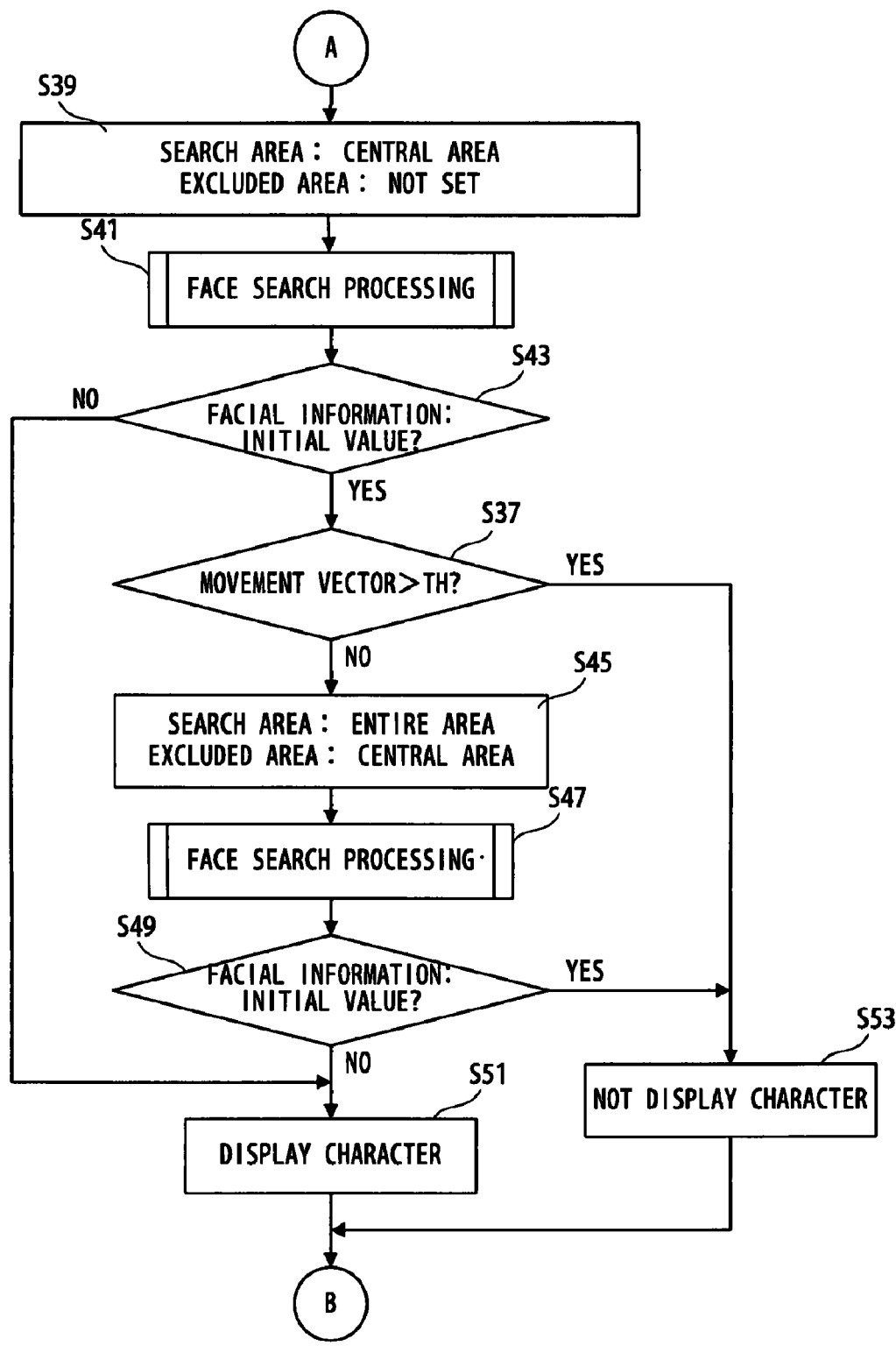
FIG. 13 is a flowchart showing another part of the operation of the CPU applied to FIG. 11 embodiment.

It should be noted that the configuration except for the configuration shown in FIG. 11-FIG. 13 is the same as that of the FIG. 1-FIG. 9 embodiment, and the configuration shown in FIG. 11-FIG. 13 is further partially common to the configuration shown in FIG. 2 and FIG. 8, and therefore, a duplicated explanation will be omitted.

With reference to FIG. 12 and FIG. 13, in a step S91, it is determined whether or not the fetched movement vector amount is above a threshold value TH3, and in a step S93, it is determined whether or not the fetched movement vector amount is above the threshold value TH2. If "YES" in the step S91, the process proceeds to a step S103, if "YES" in the step S93, the process proceeds to a step S95, and if "NO" in the step S93, the process proceeds to the step S39. Additionally, an inequality of TH3>TH2>TH is established among the threshold values TH2, TH3 and the above-described threshold value TH.

In the step S95, the central small area A2 shown in FIG. 2 is set as a search area, and the excluded area is not set. In a step S97, face search processing is executed, and in a step S99, it is determined whether or not facial information indicates the initial value. If the facial information indicates a numerical value different from the initial value, it is considered that a facial image is found, and the process proceeds to a step S101. If the facial information indicates the initial value, it is considered that the facial image has not been found yet, and the process proceeds to the step S103.

In the step S101, a corresponding instruction is applied to the character generator 34 in order to display a rectangular character K on the facial image area defined by the facial information. In the step S103, a corresponding instruction is applied to the character generator 34 in order to suspend the display of the character K. After completion of the processing in the step S101 or S103, the process returns to the step S33.

Additionally, in the step S37 shown in FIG. 13, it is determined whether or not the movement vector amount fetched in the step S35 is above the threshold value TH, and if "NO", the process proceeds to the step S45 while if "YES", the process proceeds to the step S53.

According to this embodiment, when the movement vector amount is equal to or less than the threshold value TH3 and above the threshold value TH2, the central small area A2 is taken as a search area. Furthermore, when the movement vector amount is equal to or less than the threshold value TH2 and above the threshold value TH, the central area A1 is taken as a search area. In addition, when the movement vector amount is equal to or less than the threshold value TH1, the central area A1 and the peripheral area B1 are taken as search areas. Also, when the movement vector amount is above the threshold value TH3, the face search processing is suspended.

That is, the search area is reduced in an order of "A1+B1"→"A1"→"A2"→zero as the speed of the panning and/or tilting the imaging surface 14f is increased. Accordingly, even during execution of the panning and/or tilting of the imaging surface, it is possible to precisely detect a facial image. That is, the time required for the search processing is shortened as the size of the search area is small, and therefore, when a panning and/or tilting operation of the imaging surface 14f is performed following the movement of the facial image, it is possible to continue to detect the facial image accurately.

Additionally, in FIG. 10 embodiment, as the speed of the panning and/or tilting the imaging surface 14f is increased, the size of the search area is reduced in an order of "A1+B1"→"A1", →zero, but the reduced search area is moved along a direction of the panning and/or tilting the imaging surface 14f in parallel with the size reduction processing.

Figure 14:
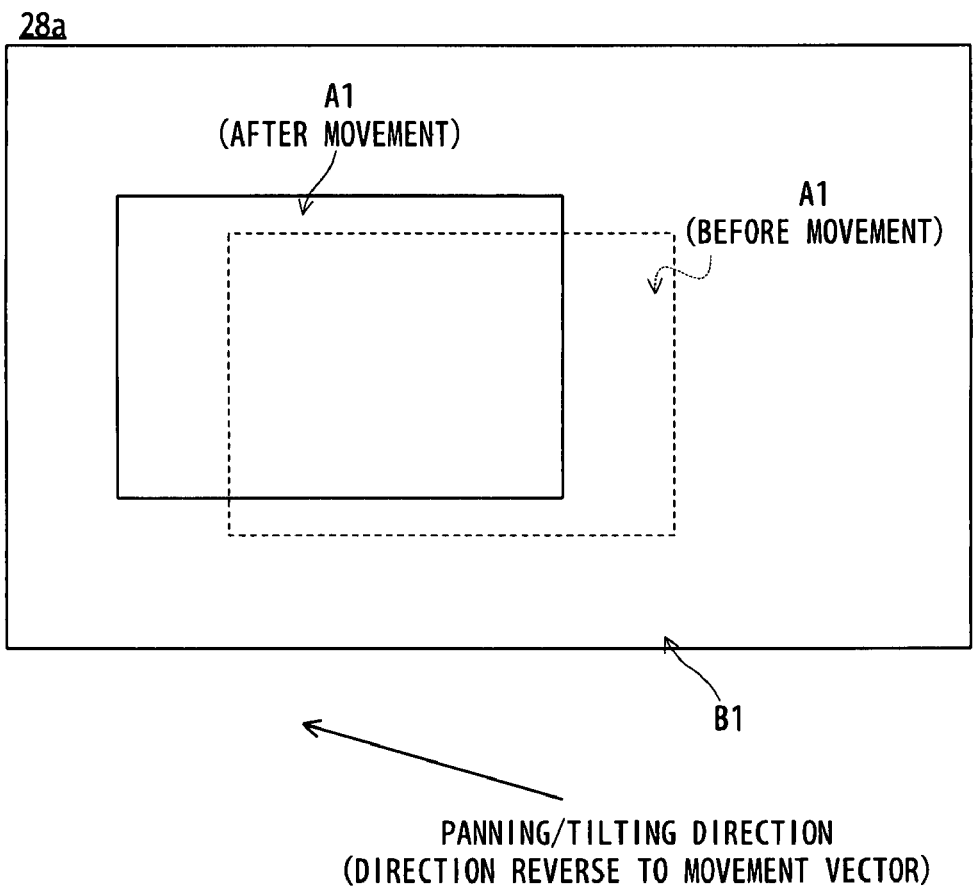
FIG. 14 is an illustrative view showing a part of an operation of a further embodiment of the present invention.
Figure 15:
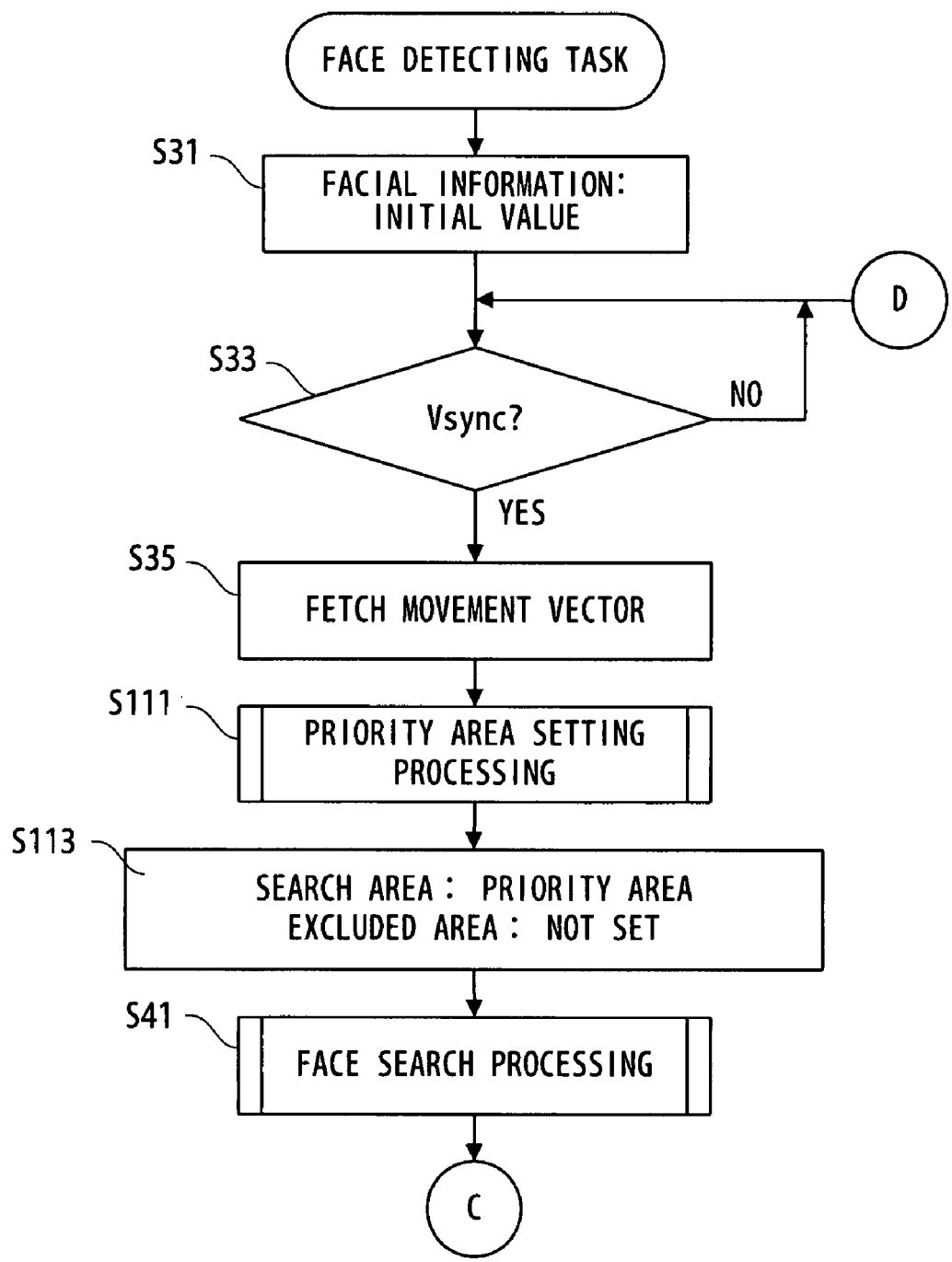
FIG. 15 is a flowchart showing a part of an operation of a CPU applied to FIG. 14 embodiment.
Figure 16:
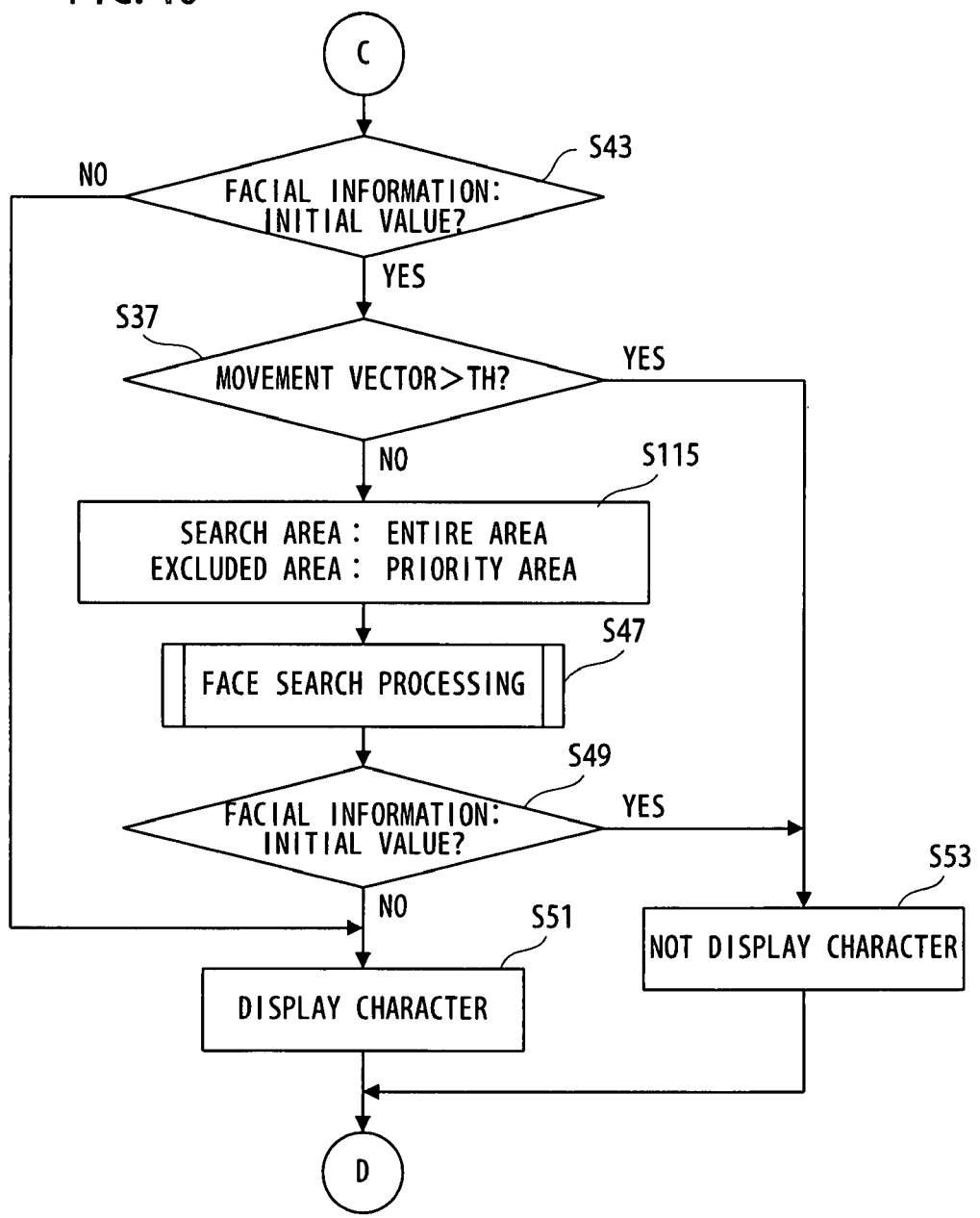
FIG. 16 is a flowchart showing another part of the operation of the CPU applied to FIG. 14 embodiment.

With reference to FIG. 14, in a case that the panning and/or tilting direction is an upper left direction, an area A1 (defined as a "priority area A1" in this embodiment) assigned at the center of the display image area 28a is also moved to the upper left direction. In order to realize such an operation, a face detecting task shown in FIG. 15-FIG. 18 is executed in place of the face detecting task shown in FIG. 8. Furthermore, a configuration except for the configuration shown in FIG. 15-FIG. 18 is the same as that in the FIG. 1-FIG. 9 embodiment, and the configuration shown in FIG. 15-FIG. 16 is also partially common to the configuration shown in FIG. 8, and therefore, a duplicated explanation will be omitted.

Referring to FIG. 15 and FIG. 16, in a step S111, priority area setting processing is executed. The priority area A1 is set to a position based on the movement vector fetched in the step S35. In a step S113, the priority area A1 is set as a search area, and the excluded area is not set. When the movement vector fetched in the step S35 is equal to or less than the threshold value TH, the process proceeds from the step S37 to a step S115 to set the entire area of the display image area 28a as a search area, while setting the priority area A1 as an excluded area.

Figure 17:
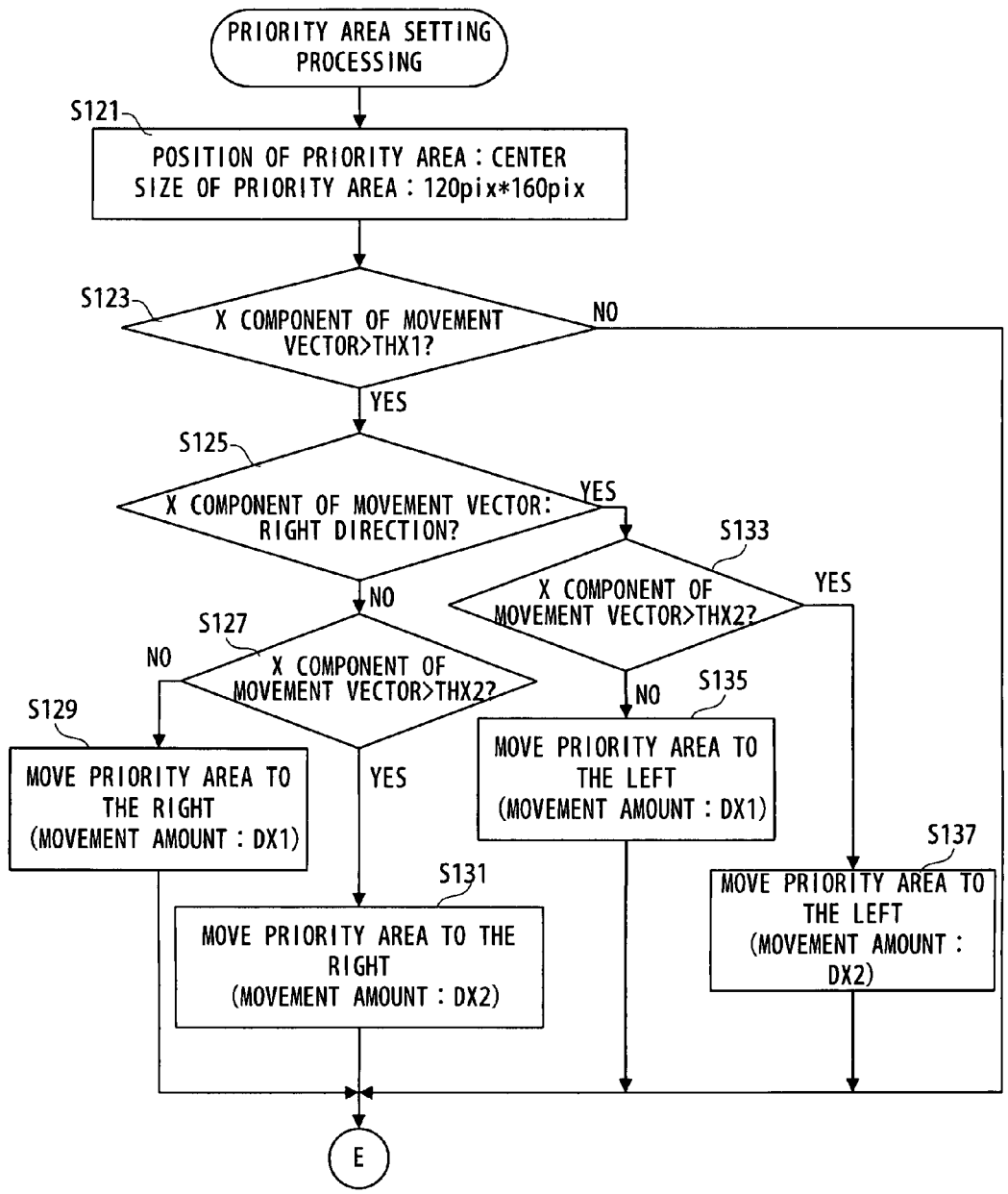
FIG. 17 is a flowchart showing the other part of the operation of the CPU applied to FIG. 14 embodiment.
Figure 18:
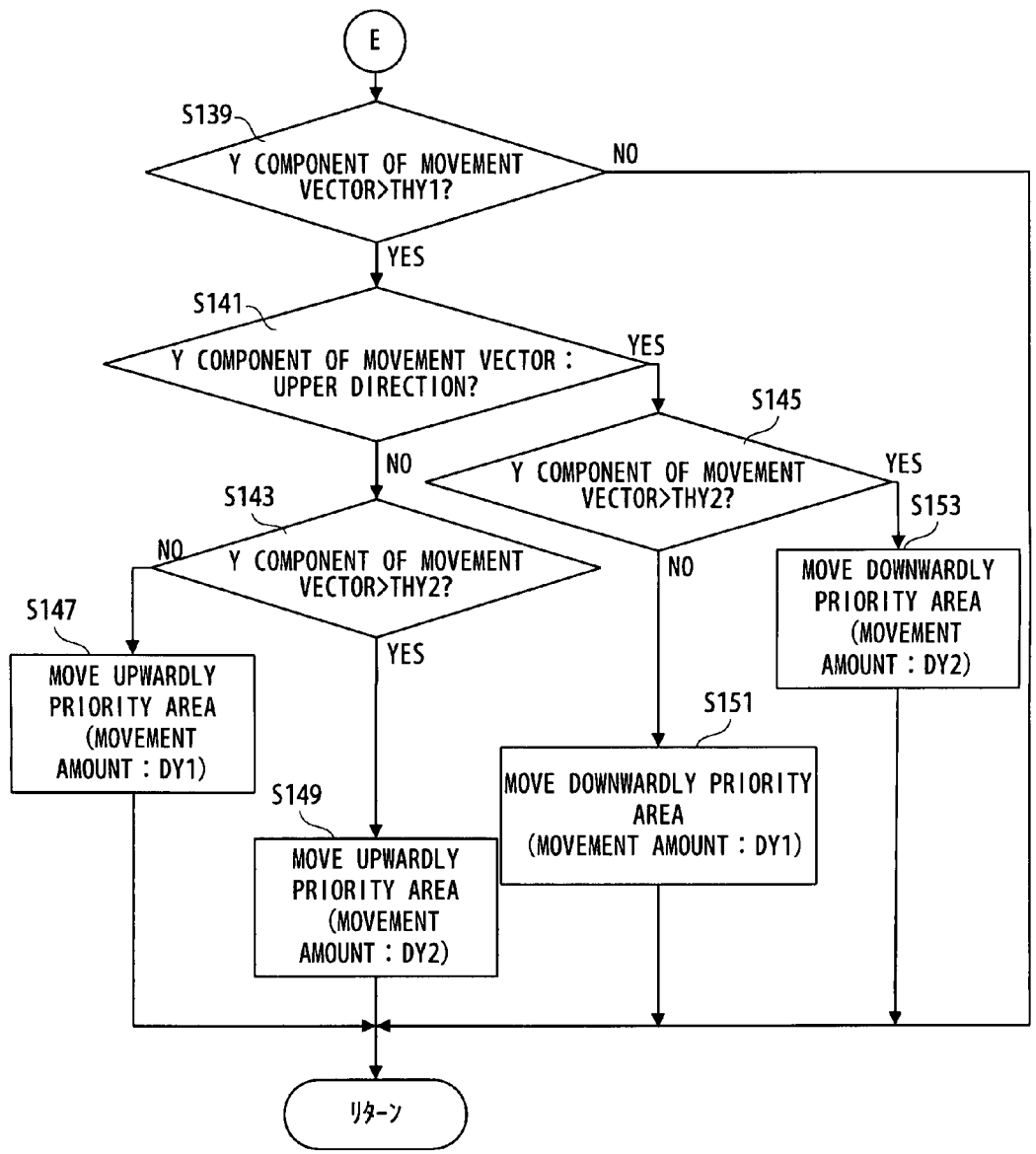
FIG. 18 is a flowchart showing a further part of the operation of the CPU applied to FIG. 14 embodiment.

The priority area setting processing in the step S111 complies with a subroutine shown in FIG. 17 and FIG. 18. First, in a step S121, the position of the priority area A1 is taken as a central position of the display image area 28a, and the size of the priority area A1 is set to 120 by 160 (vertical/horizontal) pixels. In a step S123, it is determined whether or not an X component of the movement vector is above a threshold value THX1, and in a step S125, it is determined whether or not the direction of the X component of the movement vector is a right direction, and in each of the steps S127 and S133, it is determined whether or not the X component of the movement vector is above a threshold value THX2. Additionally, an inequality of THX2>THX1 is established between the threshold values THX1 and THX2.

When "YES", "NO" and "NO" are respectively determined in the steps S123, S125 and S127, the priority area A1 is moved to the right by a movement amount DX1 in a step S129. When "YES", "NO", and "YES" are respectively determined in the steps S123, S125 and S127, the priority area A1 is moved to the right by a movement amount DX2 in a step S131.

When "YES", "YES", and "NO" are respectively determined in the steps S123, S125 and S133, the priority area A1 is moved to the left by the moving amount DX1 in a step S135. When "YES", "YES", and "YES" is respectively determined in the steps S123, S125 and S133, the priority area A1 is moved to the left by the movement amount DX2 in a step S137.

After completion of the process in the steps S129, S131, S135 or S137, the process proceeds to a step S139. Furthermore, if "NO" in the step S123, the process directly proceeds to the step S139. Additionally, an inequality of DX2>DX1 is established between the movement amounts DX1 and DX2.

In the step S139, it is determined whether or not a Y component of the movement vector is above a threshold value THY1, and in a step S141, it is determined whether or not the direction of the Y component of the movement vector is an upper direction, and in each of steps S143 and S145, it is determined whether or not the Y component of the movement vector is above a threshold value THY2. Additionally, an inequality of THY2>THY1 is established between the threshold values THY1 and THY2.

If "YES", "NO", and "NO" are respectively determined in the steps S139, S141 and S143, the priority area A1 is upwardly moved by a movement amount DY1 in a step S147. If "YES", "NO", and "YES" are respectively determined in the steps S139, S141 and S143, in a step S149, the priority area A1 is upwardly moved by a movement amount DY2.

If "YES", "YES", and "NO" is respectively determined in the steps S139, S141 and S145, the priority area A1 is downwardly moved by the movement amount DY1 in a step S151. If "YES", "YES", and "YES" are respectively determined in the steps S139, S141 and S145, the priority area A1 is moved by the movement amount DY2 in a step S153.

After completion of the step S147, S149, S151 or S153, the process is restored to the hierarchical upper level of the routine. Furthermore, if "NO" is determined in the step S139, the process is directly restored to the hierarchical upper level of the routine. Additionally, an inequality of DY2>DY1 is established between the movement amounts DY1 and DY2.

According to this embodiment, the priority area A1 is moved along the direction of the panning and/or tilting the imaging surface 14f. Thus, it is possible to easily contain the facial image in the priority area A1.

Furthermore, in this embodiment, the priority area A1 is moved in a direction the same as the direction of the panning and/or tilting of the imaging surface 14f, but the movement direction of the priority area A1 may be a direction reverse to the direction of the panning and/or tilting the imaging surface 14f. In this case, it is possible to prevent the influence of a camera shake.

Additionally, in this embodiment, although the direction and the speed of the panning and/or tilting the imaging surface 14f is detected on the basis of the movement vector, the direction and the speed of the panning and/or tilting the imaging surface 14f may be detected by means of an angular speed sensor or an acceleration sensor.

In addition, in this embodiment, a facial image of a person is assumed as a feature image, but in place of this, images of a soccer ball and a volleyball may be assumed as a feature image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager having an imaging surface to capture an object scene for repeatedly generating an object scene image;
   an assigner which assigns a search area on said imaging surface;
   an electronic searcher which repeatedly executes search processing to search a feature image on the search area assigned by said assigner in parallel with executing generation processing by said imager;
   an outputter which outputs position information representative of a position of the feature image detected by said searcher;
   a detector which detects at least one of panning and tilting of said imaging surface; and
   a changer which changes at least one of a size and a position of the search area assigned by said assigner in response to the detection of the at least one of panning and tilting of said imaging surface.

2. An electronic camera, comprising:
an imager having an imaging surface to capture an object scene for repeatedly generating an object scene image;
an assigner which assigns a search area on said imaging surface;
an electronic searcher which repeatedly executes search processing to search a feature image on the search area assigned by said assigner in parallel with executing generation processing by said imager;
an outputter which outputs position information representative of a position of the feature image detected by said searcher;
a detector which detects at least one of panning and tilting of said imaging surface; and
a changer which changes at least one of a size and a position of the search area assigned by said assigner in response to the detection of the at least one of panning and tilting of said imaging surface;
wherein said detector which detects at least one of panning and tilting of said imaging surface includes a speed detector which detects a speed of the at least one of panning and tilting of said imaging surface, and wherein said changer includes a size changer which reduces a size of said search area as the speed of the at least one of panning and tilting of said imaging surface is increased.

3. An electronic camera, comprising:
an imager having an imaging surface to capture an object scene for repeatedly generating an object scene image;
an assigner which assigns a search area on said imaging surface;
an electronic searcher which repeatedly executes search processing to search a feature image on the search area assigned by said assigner in parallel with executing generation processing by said imager;
an outputter which outputs position information representative of a position of the feature image detected by said searcher;
a detector which detects at least one of panning and tilting of said imaging surface; and
a changer which changes at least one of a size and a position of the search area assigned by said assigner in response to the detection of the at least one of panning and tilting of said imaging surface;
wherein said detector which detects at least one of panning and tilting of said imaging surface includes a direction detector which detects a direction of the at least one of panning and tilting of said imaging surface, and wherein said changer includes a position changer which moves said search area along a direction of the at least one of panning and tilting of said imaging surface.

4. An electronic camera, comprising:
an imager having an imaging surface to capture an object scene for repeatedly generating an object scene image;
an assigner which assigns a search area on said imaging surface;
an electronic searcher which repeatedly executes search processing to search a feature image on the search area assigned by said assigner in parallel with executing generation processing by said imager;
an outputter which outputs position information representative of a position of the feature image detected by said searcher;
a detector which detects at least one of panning and tilting of said imaging surface; and
a changer which changes at least one of a size and a position of the search area assigned by said assigner in response to the detection of the at least one of panning and tilting of said imaging surface;
wherein said search area includes a first search area assigned on a part of said imaging surface and a second search area assigned on another part of said imaging surface surrounding said first search area, and said searcher includes a first searcher which searches a feature image from said first search area and a second searcher which searches a feature image from said second search area.

5. An electronic camera according to claim 4, wherein said changer includes a first disabler which disables said second searcher when the speed of the panning and/or tilting of said imaging surface is above a first threshold value.

6. An electronic camera according to claim 5, wherein said changer further includes an area size reducer which reduces a size of said first search area when the speed of the panning and/or tilting of said imaging surface is above a second threshold value exceeding said first threshold value.

7. An electronic camera according to claim 6, wherein said changer further includes a second disabler which disables said first searcher when the speed of the panning and/or tilting of said imaging surface is above a third threshold value exceeding said second threshold value.

8. An electronic camera according to claim 4, wherein said second searcher executes search processing when said first searcher fails in searching.

9. An electronic camera according to claim 4, wherein said changer includes a position changer which moves said second search area along the direction of panning and/or tilting of said imaging surface.

10. An electronic camera, comprising:
an imager having an imaging surface to capture an object scene for repeatedly generating an object scene image;
an assigner which assigns a search area on said imaging surface;
an electronic searcher which repeatedly executes search processing to search a feature image on the search area assigned by said assigner in parallel with executing generation processing by said imager;
an outputter which outputs position information representative of a position of the feature image detected by said searcher;
a detector which detects at least one of panning and tilting of said imaging surface; and
a changer which changes at least one of a size and a position of the search area assigned by said assigner in response to the detection of the at least one of panning and tilting of said imaging surface;
wherein said searcher includes an image determiner which determines whether or not an image belonging to a determination area of a designated size is said feature image, and an area changer which changes a position and/or size of said determination area when a determination result by said image determiner is negative.

11. An electronic camera according to claim 10, wherein said area changer includes an area size changer which changes a size of said determination area when a position of said determination area where a determination result by said image determiner is negative is an end position, and an area position changer which changes the position of said determination area to a beginning position in relation to the changing processing by said area size changer.

12. An electronic, camera according to claim 11, wherein said area size changer changes the size of said determination area in a reducing direction.

13. An electronic camera according to claim 10, wherein said searcher further includes a creator which creates area information describing a current position of said determination area when a determination result by said image determiner is affirmative, and said outputter executes output processing in reference to the area information created by said creator.

14. An electronic camera according to claim 1, further comprising a reproducer which reproduces a motion image showing an object scene captured by said imaging surface in real time, wherein said outputter superposes a character corresponding to said position information with the motion image reproduced by said reproducer.

15. An electronic camera according to claim 1, further comprising an adjuster which adjusts an imaging condition by noting the feature image detected by said searcher when a condition adjustment operation is performed.

16. An electronic camera according to claim 15, further comprising a recorder which records an object scene image created under the imaging condition adjusted by said adjuster when a recording operation is performed.

17. An electronic camera provided with an imager having an imaging surface to capture an object scene for repeatedly generating an object scene image, comprising:
a processor;
a memory operatively linked to the processor; and
an imaging condition adjustment application program embedded in the memory and executed by the processor, wherein the executed application program performs steps comprising:
an assignment step for assigning a search area on said imaging surface;
a search step performed by the electronic camera for repeatedly executing search processing to search a feature image on the search area assigned by said assignment step in parallel with executing generation processing by said imager;
an output step for outputting position information representative of a position of the feature image detected by said search step;
a detection step for detecting at least one of panning and tilting of said imaging surface; and
a change step for changing at least one of a size and a position of the search area assigned by said assignment step in response to the detection of the at least one of panning and tilting of said imaging surface.

18. An imaging condition adjustment method of an electronic camera provided with an imager having an imaging surface to capture an object scene for repeatedly generating an object scene image, comprising:
an assignment step for assigning a search area on said imaging surface;
a search step performed by the electronic camera for repeatedly executing search processing to search a feature image on the search area assigned by said assignment step in parallel with executing generation processing by said imager;
an output step for outputting position information representative of a position of the feature image detected by said search step;
a detection step for detecting at least one of panning and tilting of said imaging surface; and
a change step for changing at least one of a size and a position of the search area assigned by said assignment step in response to the detection of the at least one of panning and tilting of said imaging surface.

* * * * *